United States Patent
Kim et al.

(10) Patent No.: US 7,647,058 B2
(45) Date of Patent: Jan. 12, 2010

(54) METHOD AND SYSTEM FOR PROCESSING BROADCAST SMS MESSAGE IN MOBILE COMMUNICATION TERMINAL, AND MOBILE COMMUNICATION TERMINAL HAVING THE SYSTEM

(75) Inventors: Jin-il Kim, Seoul (KR); Sang-hun Kim, Seoul (KR)

(73) Assignee: Pantech & Curitel Communications, Inc., Seoul (KR)

( * ) Notice: Subject to any disclaimer, the term of this patent is extended or adjusted under 35 U.S.C. 154(b) by 371 days.

(21) Appl. No.: 11/300,758

(22) Filed: Dec. 14, 2005

(65) Prior Publication Data

US 2006/0135187 A1   Jun. 22, 2006

(30) Foreign Application Priority Data

Dec. 21, 2004   (KR) ...................... 10-2004-0109681

(51) Int. Cl.
*H04W 4/00* (2006.01)
(52) U.S. Cl. ................. 455/466; 455/432.2; 455/556.1; 455/102
(58) Field of Classification Search ................. 455/411, 455/432.2, 556.1, 102
See application file for complete search history.

(56) References Cited

U.S. PATENT DOCUMENTS

| | | | |
|---|---|---|---|
| 2003/0139175 A1* | 7/2003 | Kim | 455/419 |
| 2004/0008723 A1* | 1/2004 | Uchida et al. | 370/466 |
| 2004/0009779 A1* | 1/2004 | Qu et al. | 455/466 |
| 2004/0076126 A1* | 4/2004 | Qu et al. | 370/320 |
| 2004/0076131 A1* | 4/2004 | Qu et al. | 370/335 |
| 2004/0203615 A1* | 10/2004 | Qu et al. | 455/412.1 |

* cited by examiner

*Primary Examiner*—Charles N Appiah
*Assistant Examiner*—Kwasi Karikari
(74) *Attorney, Agent, or Firm*—H.C. Park & Associates, PLC (57) ABSTRACT

A method and system for processing a broadcast SMS (Short Message Service) message in a mobile communication terminal is provided. The system includes a Broadcast Management Task which performs UI (User Interface) control; and a Main Control Task which determines whether or not a Data Burst Message received from the mobile communication system is a broadcast SMS message, and, if the Data Burst Message is the broadcast SMS message, controls such that the Broadcast Management Task performs broadcasting, where the Main Control Task determines whether or not the received broadcast SMS message is a message of a registered broadcast channel, and, if the received broadcast SMS message is not a message of the registered broadcast channel, the Main Control Task does not transmit Bearer Data to the Broadcast Management Task so that the Broadcast Management Task cannot perform unnecessary processes.

3 Claims, 6 Drawing Sheets

| FIELD | LENGTH(BITS) |
|---|---|
| MSG_TYPE('00001001') | 8 |
| ACK_SEQ | 3 |
| MSG_SEQ | 3 |
| ACK_REQ | 1 |
| VALID_ACK | 1 |
| ADDR_TYPE | 3 |
| ADDR_LEN | 4 |
| ADDRESS | 8 X ADDR_LEN |
| MSG_NUMBER | 8 |
| BURST_TYPE | 6 |
| NUM_MSGS | 8 |
| NUM_FIELDS | 8 |
| CHARi | |

FIG.6
(PRIOR ART)

| PRIORITY | 2 (BIT) |
|---|---|
| MESSAGE_ID | 6 (BIT) |
| ZONE_ID | 8 (BIT) |
| SERVICE | 16 (BIT) |
| LANGUAGE | 8 (BIT) |

FIG.7

| PARAMETER | TYPE |
|---|---|
| TELESERVICE IDENTIFIER | |
| ORIGNATING ADDRESS | |
| ORIGINATING SUBADDRESS | |
| DESTINATION ADDRESS | |
| DESTINATION SUBADDRESS | |
| BEARER REPLY OPTION | |
| SERVICE CATEGORY | |

METHOD AND SYSTEM FOR PROCESSING BROADCAST SMS MESSAGE IN MOBILE COMMUNICATION TERMINAL, AND MOBILE COMMUNICATION TERMINAL HAVING THE SYSTEM

BACKGROUND OF THE INVENTION

This application claims the priority of Korean Patent Application No. 2004-109681, filed on Dec. 21, 2004, in the Korean Intellectual Property Office, the disclosure of which is incorporated herein in its entirety by reference.

1. Field of the Invention

The present invention relates to a method and system for processing a broadcast Short Message Service (SMS) message in a mobile communication terminal and a mobile communication terminal equipped with the system so that a Main Control Task can determine whether or not the broadcast SMS message is a message of a registered broadcast channel, and that the Main Control Task cannot transmit Bearer Data to a Broadcast Management Task if the broadcast SMS message is determined to be a message of a non-registered broadcast channel.

2. Description of Related Art

Figure 1:
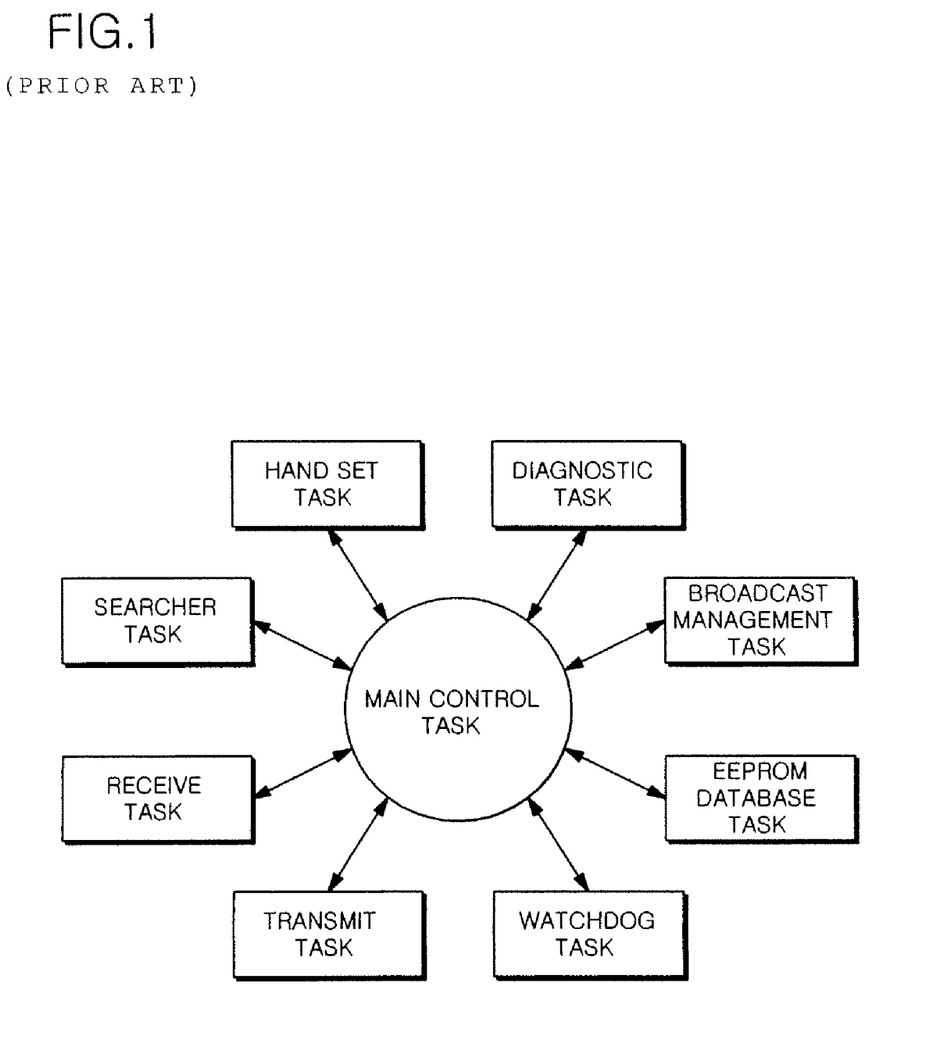
FIG. 1 is a block diagram of software configured for processing broadcast SMS messages in a mobile communication terminal.

FIG. 1 is a block diagram of software configured for processing broadcast SMS messages in a mobile communication terminal. The mobile communication terminal includes a Main Control Task which controls the mobile communication terminal, i.e., which functions as an operating system, and various applications each performing its own function while linking with the Main Control Task. A detailed description of the applications shown in FIG. 1, such as Handset Task, Diagnostic Task, Searcher Task, Receive Task, Transmit Task, Watchdog Task, and EEPROM Database Task, will not be given herein.

A mobile communication terminal equipped with an FM radio receiver function includes a Broadcast Management Task as the application. That is, the Main Control Task determines whether or not a Data Burst Message received from a mobile communication system is a broadcast SMS message and controls such that the Broadcast Management Task performs broadcasting. Under the control of the Main Control Task, the Broadcast Management Task controls User Interface (UI) provided for processing broadcast channels registered by a user of the mobile communication terminal and controls an FM radio receiver module for modulating broadcast channel frequencies, converting the modulated broadcast channel frequencies into voice signals, and outputting the voice signals vial a speaker.

Figure 2:
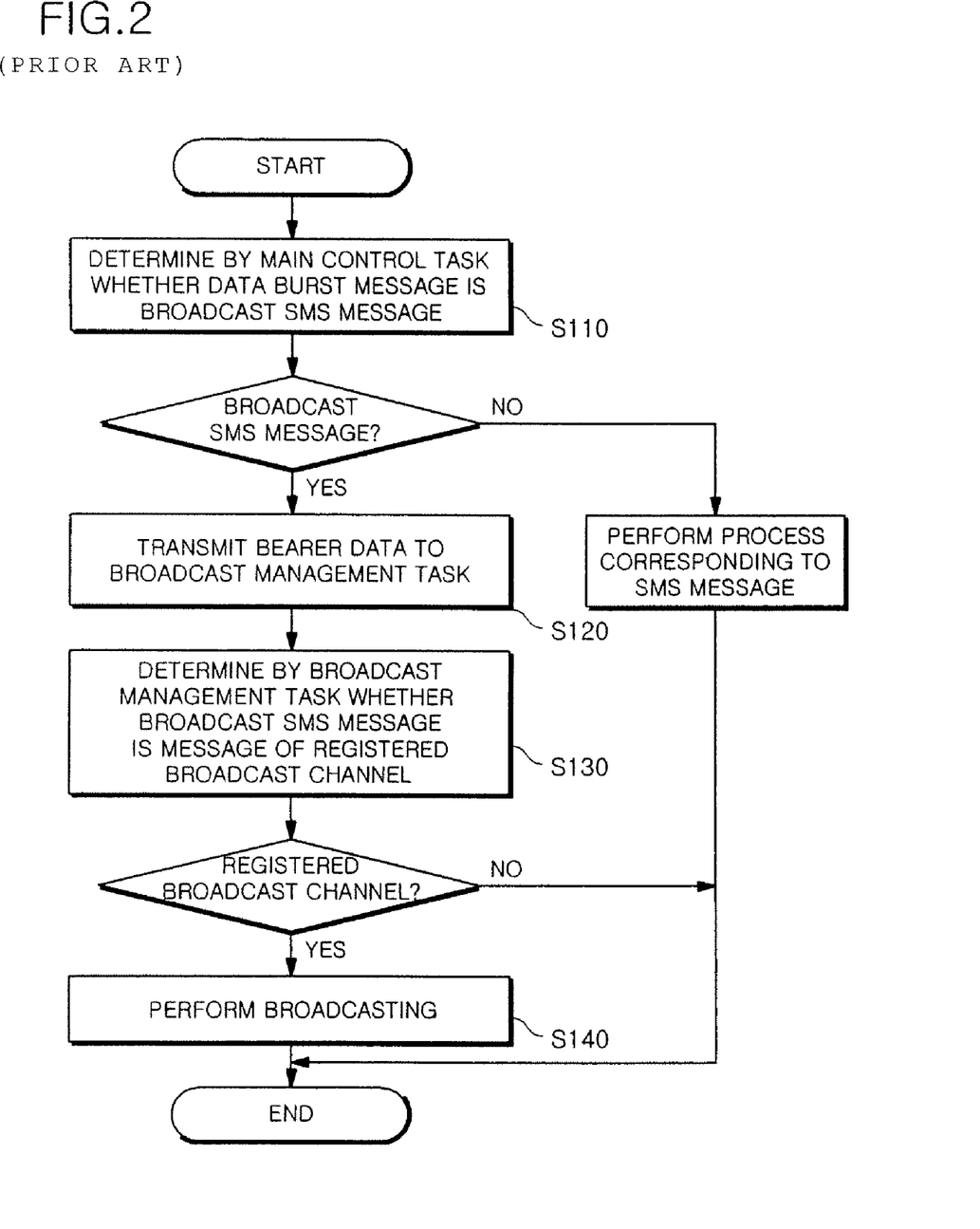
FIG. 2 is a flow chart of a method of processing a broadcast SMS message in a conventional mobile communication terminal.

FIG. 2 is a flow chart of a method of processing a broadcast SMS message in a conventional mobile communication terminal.

A mobile communication system collectively transmits broadcast SMS messages to mobile communication terminals over paging channels. The paging channel is assigned a broadcast slot. The mobile communication terminals monitoring the broadcasting slot receive the broadcast SMS messages from the mobile communication system.

Figure 5:
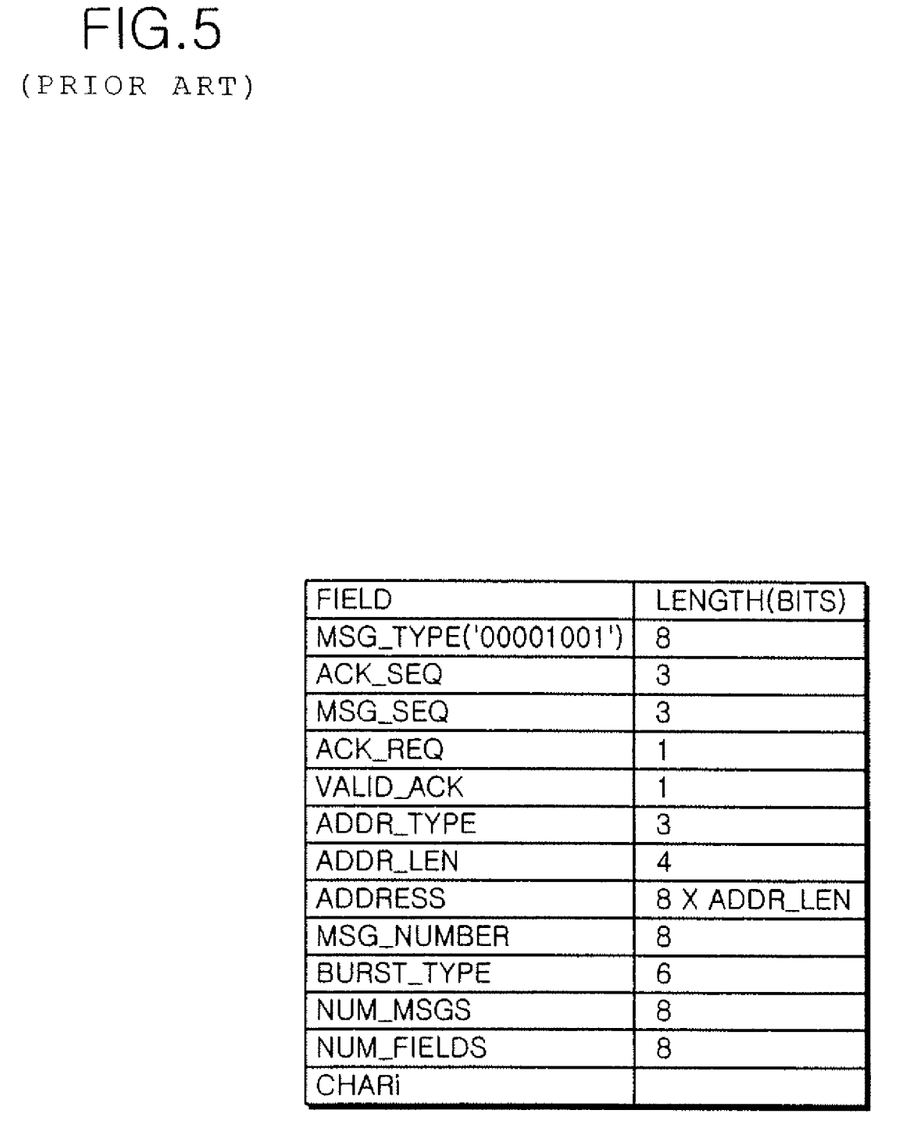
FIG. 5 is a configuration of a Data Burst Message.

The SMS message transmitted from the mobile communication system has the form of a Data Burst Message shown in FIG. 5.

In operation S110, a Main Control Task of the mobile communication terminal having received the Data Burst Message determines whether or not the Data Burst Message is a broadcast SMS message by making reference to fields ADDR_TYPE, ADDR_LEN, ADDRESS containing message sender identification information.

Currently, mobile carriers in Korea use the ADDR_TYPE field having a bit stream of '101' in a broadcast SMS message, and use the ADDR_LEN field having a maximum value of 15. The ADDRESS field is made up of sub-fields shown in FIG. 6.

The Main Control Task can determine whether or not the Data Burst Message is a broadcast SMS message in operation S110 by making reference to the fields ADDR_TYPE, ADDR_LEN, ADDRESS containing the message sender identification information of the Data Burst Message.

If the Data Burst Message is determined to be the broadcast SMS message in operation S110, the Main Control Task transmits Bearer Data contained in a field CHARi of the Data Burst Message to the Broadcast Management Task in operation S120.

In operation S130, the Broadcast Management Task determines whether or not the received broadcast SMS message is a broadcast SMS message of a broadcast channel registered by the Broadcast Management Task by making reference to a value of a parameter Service Category constituting the Bearer Data.

In operation S140, if the broadcast SMS message is one registered by the Broadcast Management Task, the Broadcast Management Task performs broadcasting through an FM radio receiver module (not shown). If the broadcast SMS message is not one registered by the Broadcast Management Task, the Broadcast Management Task disregards the broadcast SMS message.

At this time, to perform broadcasting or to disregard the broadcast SMS message, the Broadcast Management Task controls UI so that various screens can be displayed on a display device.

That is, conventionally, the Broadcast Management Task determines whether or not the received broadcast SMS message is a message of a registered broadcast channel. As a result, there is a problem in that the Broadcast Management Task has to perform an unnecessary routine for broadcast SMS messages not registered by the Broadcast Management Task.

SUMMARY OF THE INVENTION

The present invention provides a method and system for processing a broadcast Short Message Service (SMS) message in a mobile communication terminal and a mobile communication terminal equipped with the system so that a Main Control Task can determine whether or not the broadcast SMS message is a message of a registered broadcast channel, and that the Main Control Task cannot transmit Bearer Data to a Broadcast Management Task if the broadcast SMS message is determined to be a message of a non-registered broadcast channel.

According to an aspect of the present invention, there is provided a system for processing a broadcast SMS message in a mobile communication terminal, the system including: a Broadcast Management Task which controls UI (User Interface) provided for processing broadcast channels registered by a user of the mobile communication terminal and controls an FM (Frequency Modulation) radio receiver module for modulating broadcast channel frequencies, converting the modulated broadcast channel frequencies into voice signals, and outputting the voice signals via a speaker; and a Main Control Task which determines whether or not a Data Burst Message received from the mobile communication system is a broadcast SMS message, and controls such that the Broadcast Management Task performs broadcasting if the Data Burst Message is the broadcast SMS message, where the Main Control Task determines whether or not the received broadcast SMS message is a message of a registered broadcast channel, and, if the received broadcast SMS message is not a message of the registered broadcast channel, the Main Control Task does not transmit Bearer Data to the Broadcast Management Task so that the Broadcast Management Task cannot perform unnecessary processes.

The Main Control Task may include: a message type determiner determining whether or not a Data Burst Message is a broadcast SMS message by making reference to fields ADDR_TYPE, ADDR_LEN, ADDRESS containing message sender identification information on the Data Burst Message; a broadcast channel determiner which, if the Data Burst Message is determined to be the broadcast SMS message by the message type determiner, determines whether or not the broadcast SMS message is a message of a registered broadcast channel by making reference to a sub-field Service of the ADDRESS field; and a broadcast controller which transmits Bearer Data contained in a field CHARi of the Data Burst Message to the Broadcast Management Task if the broadcast SMS message is determined to be a message of the registered broadcast channel by the broadcast channel determiner, and which disregards the Data Burst Message if the broadcast SMS message is determined to be a message of a non-registered broadcast channel.

According to another aspect of the present invention, there is provided a mobile communication terminal equipped with the system for processing a broadcast SMS message.

According to still another aspect of the present invention, there is provided a method of processing a broadcast SMS message in a mobile communication terminal including a Main Control Task determining whether or not a Data Burst Message received from a mobile communication system is a broadcast SMS message and a Broadcast Management Task performing broadcasting if the Data Burst Message is the broadcast SMS message, the method including the operations of determining in the Main Control Task whether or not the received broadcast SMS message is a message of a registered broadcast channel; and, if the broadcast SMS message is not determined to be a message of the registered broadcast channel, not transmitting Bearer Data to the Broadcast Management Task so that the Broadcast Management Task cannot perform unnecessary processes.

The method may include the operations of: determining by the Main Control Task whether or not a Data Burst Message is a broadcast SMS message by making reference to fields ADDR_TYPE, ADDR_LEN, ADDRESS containing message sender identification information of the Data Burst Message; determining by the Main Control Task whether or not the broadcast SMS message is a message of a registered broadcast channel by making reference to a sub-field Service of the ADDRESS field if the Data Burst Message is determined to be the broadcast SMS message; and transmitting, by the Main Control Task, Bearer Data contained in a field CHARi of the Data Burst Message to the Broadcast Management Task if the broadcast SMS message is determined to be a message of the registered broadcast channel, and disregarding, by the Main Control Task, the Data Burst Message if the broadcast SMS message is determined to be a message of a non-registered broadcast channel.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings.

As shown in FIG. 1, a mobile communication terminal includes a Main Control Task which controls the mobile communication terminal, i.e., which functions as an operating system, and various applications each performing its own function while linking with the Main Control Task. A mobile communication terminal equipped with an FM radio receiver function includes a Broadcast Management Task as the application.

A system for processing a broadcast short message service (SMS) message in a mobile communication terminal according to an embodiment of the present invention has a configuration including the Main Control Task and the Broadcast Management Task.

Figure 3:
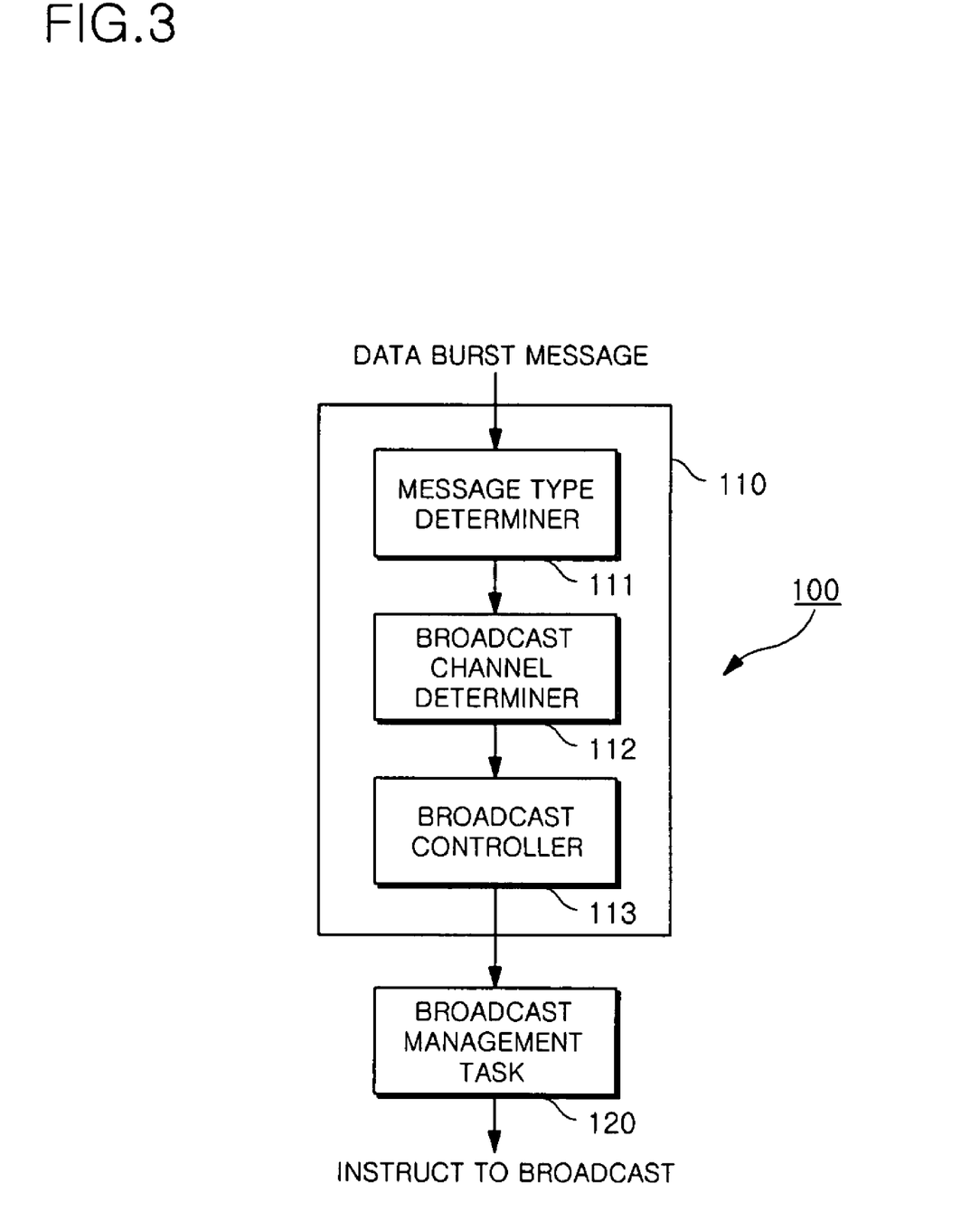
FIG. 3 is a block diagram of a system for processing a broadcast SMS message in a mobile communication terminal in accordance with an embodiment of the present invention.

FIG. 3 is a block diagram of a system for processing a broadcast SMS message in a mobile communication terminal in accordance with an embodiment of the present invention.

A broadcast SMS message processing system 100 of a mobile communication terminal according to an embodiment of the present invention includes a Main Control Task 110 and a Broadcast Management Task 120.

The Main Control Task 110 determines whether or not a Data Burst Message received from a mobile communication system is a broadcast SMS message. If the Data Burst Message is determined to be the broadcast SMS message, the Main Control Task 110 controls such that the Broadcast Management Task performs broadcasting.

The Broadcast Management Task 120 controls User Interface (UI) provided for processing broadcast channels registered by a user of the mobile communication terminal and controls an FM radio receiver module (not shown) for modulating broadcast channel frequencies, converting the modulated broadcast channel frequencies into voice signals, and outputting the voice signals vial a speaker.

At this time, the Main Control Task 110 determines whether or not the received broadcast SMS message is a message of a registered broadcast channel. If the broadcast SMS message is determined to be a message of non-registered broadcast channel, the Main Control Task 110 does not transmit Bearer Data to the Broadcast Management Task 120 so that the Broadcast Management Task 120 cannot perform unnecessary processes. For this, the Main Control Task 110 includes a message type determiner 111, a broadcast channel determiner 112, and a broadcast controller 113.

The message type determiner 111 determines whether or not the Data Burst Message is a broadcast SMS message by making reference to fields ADDR_TYPE, ADDR_LEN, ADDRESS containing message sender identification information of the Data Burst Message.

The mobile communication system periodically transmits broadcast SMS messages to mobile communication terminals over paging channels. The paging channel is assigned a broadcast slot used only for broadcasting. The mobile communication terminals monitoring the broadcast slot receives the broadcast SMS message from the mobile communication system.

The SMS message transmitted from the mobile communication system has the form of the Data Burst Message shown in FIG. 5.

Currently, mobile carriers in Korea use the ADDR_TYPE field having a bit stream of '101' in a broadcast SMS message, and use the ADDR_LEN field having a maximum value of 15. The ADDRESS field is made up of sub-fields shown in FIG. 6.

Accordingly, the Main Control Taskcan determine through the message type determiner 111 whether or not the Data Burst Message is a broadcast SMS message by making reference to the fields ADDR_TYPE, ADDR_LEN, ADDRESS containing the message sender identification information of the Data Burst Message.

When the Data Burst Message is determined to be the broadcast SMS message by the message type determiner 111, the broadcast channel determiner 112 determines whether or not the broadcast SMS message is a message of a registered broadcast channel by making reference to a sub-field Service of the ADDRESS field.

Figure 6:
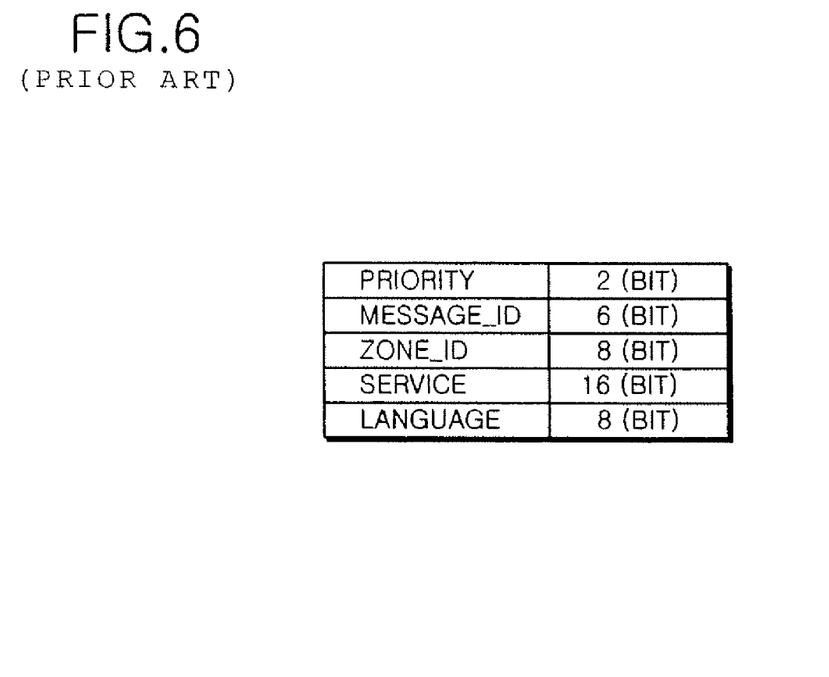
FIG. 6 is a configuration of a field ADDRESS contained in a Data Burst Message.
Figure 7:
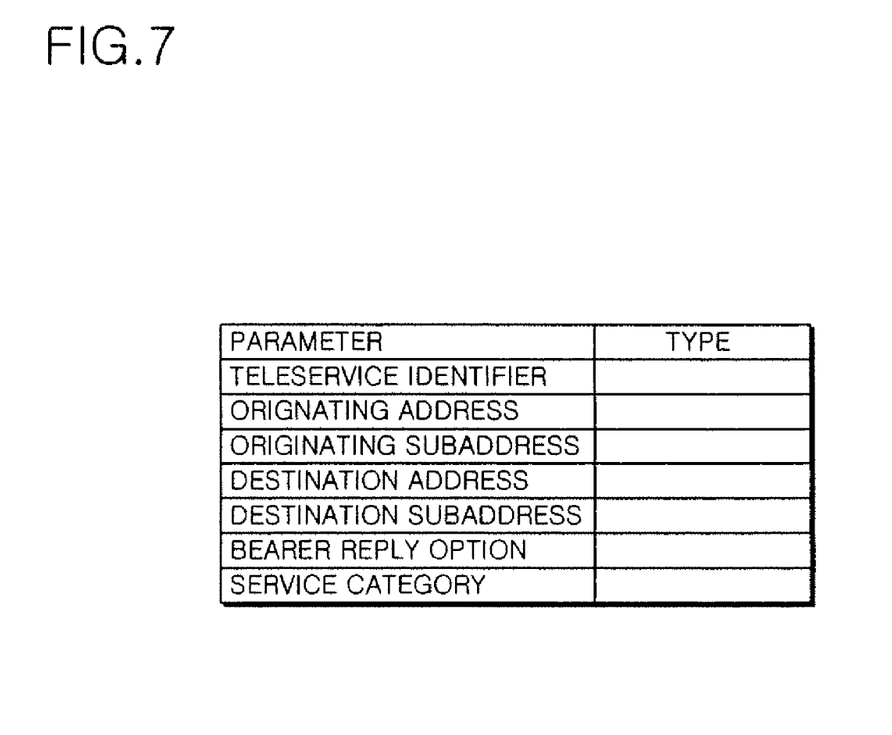
FIG. 7 is a configuration of Bearer Data.

A value of the Service sub-field of the ADDRESS field contained in the Data Burst Message shown in FIG. 6 is equal to a value of a parameter Service Category of Bearer Data transmitted to the Broadcast Management Task 120 shown in FIG. 7.

Conventionally, the Broadcast Management Task 120 determines whether or not the Data Burst Message is a broadcast SMS message registered by the Broadcast Management Task 120 by making reference to a value of the Service Category parameter of the Bearer Data. In this case, there is a problem in that the Broadcast Management Task 120 has to perform a process for a broadcast SMS message of a broadcast channel not registered by the Broadcast Management Task 120, e.g., an unnecessary UI process such as outputting an error message.

According to the present invention, when the Data Burst Message is determined to be the broadcast SMS message by the message type determiner 111, the Main Control Task 110 determines that the broadcast SMS message is a message of a registered broadcast channel by making reference to the Service sub-field of the ADDRESS field through the broadcast channel determiner 112.

When the broadcast SMS message is determined to be a message of the registered broadcast channel by the broadcast channel determiner 112, the broadcast controller 113 transmits Bearer Data contained in the CHARi field of the Data Burst Message to the Broadcast Management Task 120. Meanwhile, when the broadcast SMS message is not determined to be a message of the registered broadcast channel by the broadcast channel determiner 112, the broadcast controller 113 disregards the Data Burst Message.

If the broadcast SMS message is determined to be a message of the registered broadcast channel by making reference to the Service sub-field of the ADDRESS field through the broadcast channel determiner 112, the Main Control Task 110 transmits Bearer Data contained in the CHARi field of the Data Burst Message to the Broadcast Management Task 120.

The Broadcast Management Task 120 receives the Bearer Data from the Main Control Task 110 to perform broadcasting through an FM radio receiver module (not shown), and performs UI control such as displaying various screens on a display device.

On the contrary, if the broadcast SMS message is not determined to be a message of the registered broadcast channel by making reference to the Service sub-field of the ADDRESS field through the broadcast channel determiner 112, the Main Control Task 110 disregards the Data Burst Message.

That is, according to the present invention, the Main Control Task 110 determines whether or not a received broadcast SMS message is a message of a registered broadcast channel. Accordingly, since the Bearer Data is not transmitted to the Broadcast Management Task 120 if the broadcast SMS message is not determined to be a message of the registered broadcast channel, the Broadcast Management Task 120 needs not to perform unnecessary processes, thereby increasing waiting time of a mobile communication terminal.

Figure 4:
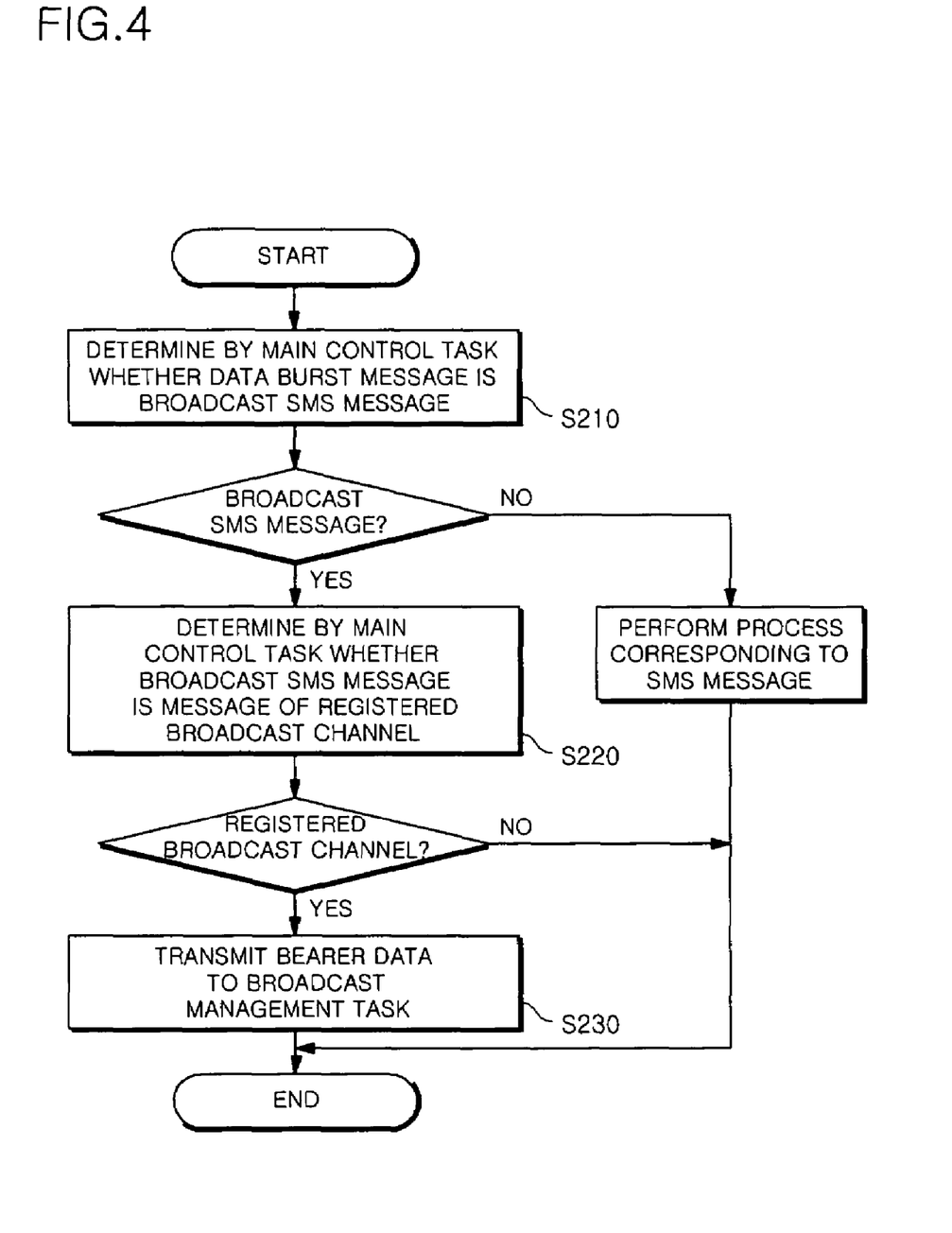
FIG. 4 is a flow chart of a method of processing a broadcast SMS message in a mobile communication terminal in accordance with another embodiment of the present invention.

FIG. 4 is a flow chart of a method of processing a broadcast SMS message in a mobile communication terminal in accordance with an embodiment of the present invention.

The method of processing a broadcast SMS message in a mobile communication terminal, which includes a Main Control Task determining whether or not a Data Burst Message received from a mobile communication system is a broadcast SMS message and a Broadcast Management Task performing broadcasting if the Data Burst Message is the broadcast SMS message, includes the operation of determining in the Main Control Task whether or not the received broadcast SMS message is a message of a registered broadcast channel; and, if the broadcast SMS message is not a message of the registered broadcast channel, the operation of not transmitting Bearer Data to the Broadcast Management Task so that the Broadcast Management Task cannot perform unnecessary processes.

According to the present embodiment, in operation S210, the Main Control Task 110 determines that the Data Burst Message is a broadcast SMS message by making reference to fields ADDR_TYPE, ADDR_LEN, ADDRESS containing message sender identification information of the Data Burst Message.

In operation S220, if the Data Burst Message is determined to be the broadcast SMS message in operation S210, the Main Control Task 110 determines that the broadcast SMS message is a message of a registered broadcast channel by making reference to the Service sub-field of the ADDRESS field contained in the Data Burst Message.

That is, since a value of the Service sub-field of the ADDRESS field contained in the Data Burst Message is equal to a value of a parameter Service Category of the Bearer Data transmitted to the Broadcast Management Task 120, the Main Control Task 110 can determine whether or not the broadcast SMS message is a message of a registered broadcast channel by making reference to the Service sub-field of the ADDRESS field contained in the Data Burst Message in operation S220.

In operation S230, if the Data Burst Message is determined to be a message of the registered broadcast channel in operation S220, the Main Control Task 110 transmits the Bearer Data contained in the CHARi field of the Data Burst Message to the Broadcast Management Task 120. On the contrary, if the Data Burst Message is not determined to be a message of the registered broadcast channel in operation S220, the Main Control Task 110 does not transmit the Bearer Data contained in the CHARi field of the Data Burst Message to the Broadcast Management Task 120, i.e., the Main Control Task 110 disregards the Data Burst Message.

As apparent from the above description, according to the present invention, the Main Control Task determines whether or not a received broadcast SMS message is a message of a registered broadcast channel. Accordingly, if the broadcast SMS message is not determined to be a message of the registered broadcast channel by the Main Control Task, the Main Control Task does not transmit Bearer Data to the Broadcast Management Task so that the Broadcast Management Task cannot perform unnecessary processes.

While the present invention has been described with reference to exemplary embodiments thereof, it will be understood by those skilled in the art that various changes in form and details may be made therein without departing from the scope of the present invention as defined by the following claims.

What is claimed is:

1. A system for processing a broadcast SMS (Short Message Service) message in a mobile communication terminal, the system comprising:
    a Broadcast Management Task to perform UI (User Interface) control to process broadcast channels registered by a user of the mobile communication terminal, and to control an FM (Frequency Modulation) radio receiver module to modulate broadcast channel frequencies, to convert the modulated broadcast channel frequencies into voice signals, and to output the voice signals via a speaker; and
    a Main Control Task to determine whether a Data Burst Message received from a mobile communication system is a broadcast SMS message, and to control the Broadcast Management Task to perform broadcasting if the Data Burst Message is the broadcast SMS message,
    wherein the Main Control Task determines whether the received broadcast SMS message is a message of a registered broadcast channel, and transmits the received broadcast SMS message to the Broadcast Management Task only if the received broadcast SMS message is a message of the registered broadcast channel, and
    wherein the Main Control Task comprises:
    a message type determiner to determine whether the Data Burst Message is the broadcast SMS message by referencing fields ADDR_TYPE, ADDRLEN, ADDRESS containing message sender identification information on the Data Burst Message;
    a broadcast channel determiner to determine whether the broadcast SMS message is a message of the registered broadcast channel by referencing a sub-field Service of the ADDRESS field; and
    a broadcast controller to transmit Bearer Data contained in a field CHARi of the Data Burst Message to the Broadcast Management Task if the broadcast SMS message is determined to be a message of the registered broadcast channel by the broadcast channel determiner, and to disregard the Data Burst Message if the broadcast SMS message is determined to be a message of a non-registered broadcast channel.

2. A mobile communication terminal equipped with a system for processing a broadcast SMS (Short Message Service) message, said system comprising:
    a Broadcast Management Task to perform UI (User Interface) control to process broadcast channels registered by a user of the mobile communication terminal, and to control an FM (Frequency Modulation) radio receiver module to modulate broadcast channel frequencies, to convert the modulated broadcast channel frequencies into voice signals, and to output the voice signals via speaker; and
    a Main Control Task to determine whether a Data Burst Message received from a mobile communication system is a broadcast SMS message, and to control the Broadcast Management Task to perform broadcasting if the Data Burst Message is the broadcast SMS message,
    wherein the Main Control Task determines whether the received broadcast SMS message is a message of a registered broadcast channel, and transmits the received broadcast SMS message to the Broadcast Management Task only if the received broadcast SMS message is a message of the registered broadcast channel, and
    wherein the Main Control Task comprises:
    a message type determiner to determine whether the Data Burst Message is the broadcast SMS message by referencing fields ADDR TYPE, ADDRLEN, ADDRESS containing message sender identification information on the Data Burst Message;
    a broadcast channel determiner to determine whether the broadcast SMS message is a message of the registered broadcast channel by referencing a sub-field Service of the ADDRESS field; and
    a broadcast controller to transmit Bearer Data contained in a field CHARi of the Data Burst Message to the Broadcast Management Task if the broadcast SMS message is determined to be a message of the registered broadcast channel by the broadcast channel determiner, and to disregard the Data Burst Message if the broadcast SMS message is determined to be a message of a non-registered broadcast channel.

3. A method for processing a broadcast SMS (Short Message Service) message in a mobile communication terminal including a Main Control Task determining whether a Data Burst Message received from a mobile communication system is a broadcast SMS message and a Broadcast Management Task performing broadcasting if the Data Burst Message is the broadcast SMS message, the method comprising:
    determining in the Main Control Task whether the received broadcast SMS message is a message of a registered broadcast channel;
    transmitting Bearer Data from the Main Control Task to the Broadcast Management Task only if the broadcast SMS message is determined to be a message of the registered broadcast channel;
    determining by the Main Control Task whether the Data Burst Message is the broadcast SMS message by referencing fields ADDR TYPE, ADDR LEN, ADDRESS containing message sender identification information of the Data Burst Message;
    determining by the Main Control Task whether the broadcast SMS message is a message of the registered broadcast channel by referencing a sub-field Service of the ADDRESS field if the Data Burst Message is determined to be the broadcast SMS message; and
    transmitting, by the Main Control Task, Bearer Data contained in a field CHARi of the Data Burst Message to the Broadcast Management Task if the broadcast SMS message is determined to be a message of the registered broadcast channel, and disregarding, by the Main Control Task, the Data Burst Message if the broadcast SMS message is determined to be a message of a non-registered broadcast channel.

* * * * *